H. B. LANSING.
Corn-Planter.
No. 52,861. Patented Feb 27, 1866.
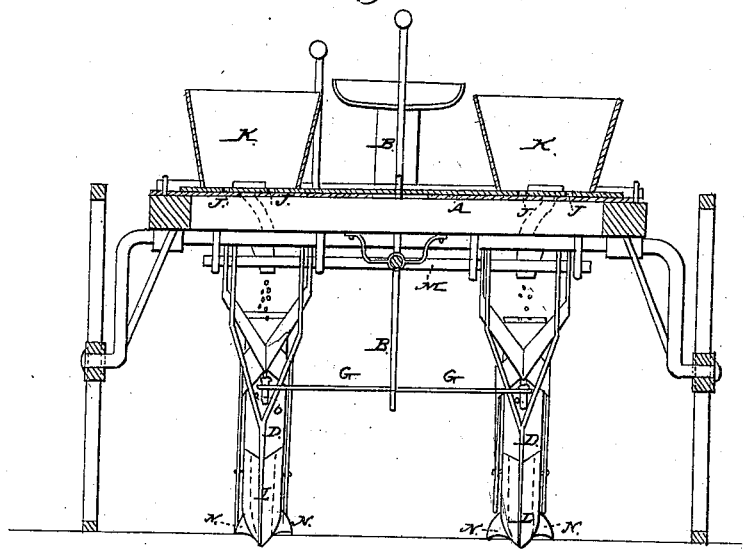
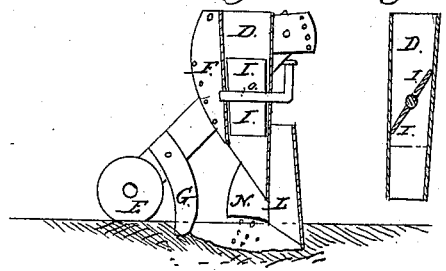
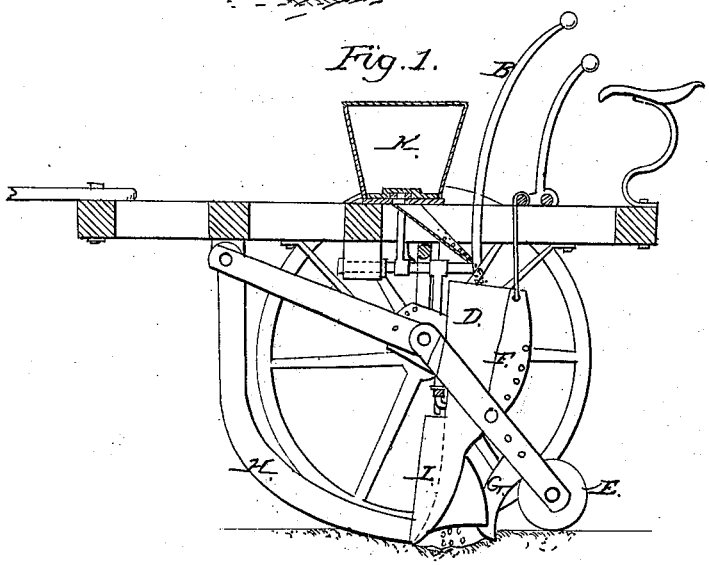
Witnesses:
Inventor:
Henry B Lansing

United States Patent Office.

HENRY B. LANSING, OF HUDSON, MICHIGAN.

IMPROVEMENT IN CORN-PLANTERS.

Specification forming part of Letters Patent No. 52,861, dated February 27, 1866.

*To all whom it may concern:*

Be it known that I, HENRY B. LANSING, of Hudson, Lenawee county, in the State of Michigan, have invented a new and useful Improvement in Corn-Planters; and I do hereby declare that the following is a full, clear, and exact description of the construction and operation of the same, reference being had to the annexed drawings, making a part of this specification, in which—

Figure 1 is a side view; Fig. 2, a transverse section; Section 1, a perspective view of the tooth, and Section 2 a transverse section of the tooth.

The design of my machine is to plant two rows of corn at a time, to mark the ground one way, to open the earth for reception of the seed, and, lastly, to cover the corn of a uniform depth by means of the adjustable inverted shares $g$, as seen in Fig. 1 and Section 1, and also by means of the elevation or depression of the adjustable roller E upon the perforated rear extension, F, of the tooth D, as seen in Fig. 1 and Section 1.

B B represent the hand-lever which carries the feed-bar A A. The lower end of the said lever is connected with the rod $c\,c$, which operates the valves $i\,i$ in tooth D by connecting with an elbow of the rod $o$, which passes through the tooth D and the valve $i\,i$, as seen in Section 1 and Fig. 2. As the lever B B is pushed to the right the corn escapes from the hopper K through the openings J J in feed-bar A to the tooth D, and is there held by the valves $i\,i$ until the row is reached, and is then dropped to the ground through tooth D by motion of the lever B B to the left, which releases the corn from the tooth B, and at the same time upon the opposite side of said valve and tooth is received the corn on the way from the hopper K for the next hill.

H represents a knife for cutting the old stalks which may lie upon the ground, the lower end of which is attached to the steel point or share $l$, the upper end to the rod $m$, as seen in Fig. 2.

N N in Fig. 2 represent two steel flanges on the rear of the share $l$ for the purpose of crowding lumps of earth and stone away from the corn. The steel share $l$ is intended to push or separate the soil in manner that it may fall back after the tooth D, instead of rolling it away as an ordinary share or tooth.

Having thus described my invention, what I desire to secure by Letters Patent is—

1. The rear extension, F, of the tooth D, for the purpose of retaining the tooth a certain depth in the ground, whether hard or mellow, by means of the roller and weights applied to said extension F.

2. The manner of attaching the stalk-cutters to a wheel-planter, in the manner and for the purpose set forth.

3. The compound lever B B, in connection with the feed-bar A A and the rod $c\,c$, arranged in the manner and for the purpose substantially as set forth.

HENRY B. LANSING.

Witnesses:
L. R. PEIRSON,
F. B. BEASOM.